United States Patent
Trively

(10) Patent No.: US 8,407,089 B2
(45) Date of Patent: Mar. 26, 2013

(54) SYSTEM AND METHOD FOR RECEIVING AND RESPONDING TO PROMOTIONAL OFFERS USING A MOBILE PHONE

(75) Inventor: Martin Churchill Trively, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1714 days.

(21) Appl. No.: 10/707,638

(22) Filed: Dec. 29, 2003

(65) Prior Publication Data

US 2005/0149385 A1 Jul. 7, 2005

(51) Int. Cl.
*G06Q 30/00* (2012.01)
(52) U.S. Cl. ........... 705/14.36; 705/14.1; 705/14.14; 705/14.19; 455/461; 379/90.01; 379/93.03
(58) Field of Classification Search ........... 705/1–28; 379/90.01, 93.03; 455/461
See application file for complete search history.

(56) References Cited

U.S. PATENT DOCUMENTS

| | | | |
|---|---|---|---|
| 7,424,617 B2 * | 9/2008 | Boyd et al. ............... 713/176 |
| 2001/0039514 A1 * | 11/2001 | Barenbaum et al. ......... 705/14 |
| 2002/0028708 A1 | 3/2002 | Busch et al. |
| 2002/0194270 A1 * | 12/2002 | Gagnon ................... 709/203 |
| 2003/0054878 A1 | 3/2003 | Benoy et al. |
| 2004/0181448 A1 * | 9/2004 | Hartsman et al. ............ 705/14 |
| 2004/0254836 A1 * | 12/2004 | Emoke Barabas et al. ..... 705/14 |

FOREIGN PATENT DOCUMENTS

WO 99/67938 12/1999

OTHER PUBLICATIONS

Sony Ericsson Mobile Communications AB, International Application No. PCT/US04/024098, "International Search Report", Feb. 14, 2007.
Sony Ericsson Mobile Communications AB, International Application No. PCT/US04/024098, "Written Opinion", Feb. 14, 2007.

* cited by examiner

*Primary Examiner* — Scott D Gartland
(74) *Attorney, Agent, or Firm* — Sreenivas Vedantam; Moore & Van Allen PLLC

(57) ABSTRACT

A method and means by which a mobile phone can participate in a promotional offer that is sponsored by an interested party is disclosed. The sponsor creates a promotional campaign and defines its parameters using promotional offer code (POC) data. The POC data is then pre-provisioned into the mobile phone. If a mobile phone user becomes aware of the promotional campaign and wishes to participate, he navigates his mobile phone menu structure to a "promotions" menu and inputs a POC that was included in the sponsor's advertisements. The mobile phone then links the input POC to the pre-provisioned POC data. Another function in the mobile phone then constructs a promotional offer entry (POE) that conforms to the parameters set out in the pre-provisioned POC data. The POE is then transmitted to the sponsor. The sponsor reviews all valid entries and chooses one or more winners. The sponsor can then broadcast a status message to all entrants to inform them whether they won anything from the promotion.

27 Claims, 3 Drawing Sheets

SYSTEM AND METHOD FOR RECEIVING AND RESPONDING TO PROMOTIONAL OFFERS USING A MOBILE PHONE

BACKGROUND OF INVENTION

Mobile phone handset manufacturers and wireless carriers are engaged in highly competitive industries. A major concern for these entities is engendering brand loyalty among their customers since it is relatively easy to switch to a different mobile phone brand or to a different wireless carrier. One way to promote brand loyalty is to keep the customer engaged with the handset manufacturer or wireless carrier by offering contests or promotional campaigns that award prizes to the winners.

To effectively run a promotional campaign requires the sponsor to bear the burden of effort and minimize effort required of the mobile phone user. Thus, the process should be automated to the greatest possible extent.

In addition, the sponsor can craft a promotion so as to reward specific behavior, such as high-end model purchases, or significant minute usage. Other promotions can serve as a useful means for gathering survey data since the sponsor can specify the format and content of a promotional entry.

SUMMARY OF INVENTION

The present invention describes a method and means by which a mobile phone can participate in a promotional offer that is sponsored by an interested party. Interested parties can include, but are not limited to, mobile phone handset makers and wireless carriers. The sponsor creates a promotional campaign and defines its parameters using promotional offer code (POC) data. The POC data is then pre-provisioned into the mobile phone either at the time of manufacture or via an over-the-air (OTA) process that is transparent to the mobile phone user. The sponsor then advertises the promotional campaign in any number of ways including, but not limited to, direct mail, television commercial, radio commercial, Internet advertisements, e-mail, SMS messaging, or MMS messaging.

If a mobile phone user becomes aware of the promotional campaign and wishes to participate, he navigates his mobile phone menu structure to a "promotions" menu and inputs a POC that was included in the sponsor's advertisements. The mobile phone then links the input POC to the pre-provisioned POC data. Another function in the mobile phone then constructs a promotional offer entry (POE) that conforms to the parameters set out in the pre-provisioned POC data. The POE can be an SMS, MMS, or e-mail message, or other mode. The POE is then transmitted to the sponsor. The sponsor reviews all valid entries and chooses one or more winners. The sponsor then broadcasts a status message to all entrants to inform them whether they won anything from the promotion.

DETAILED DESCRIPTION

Figure 1:
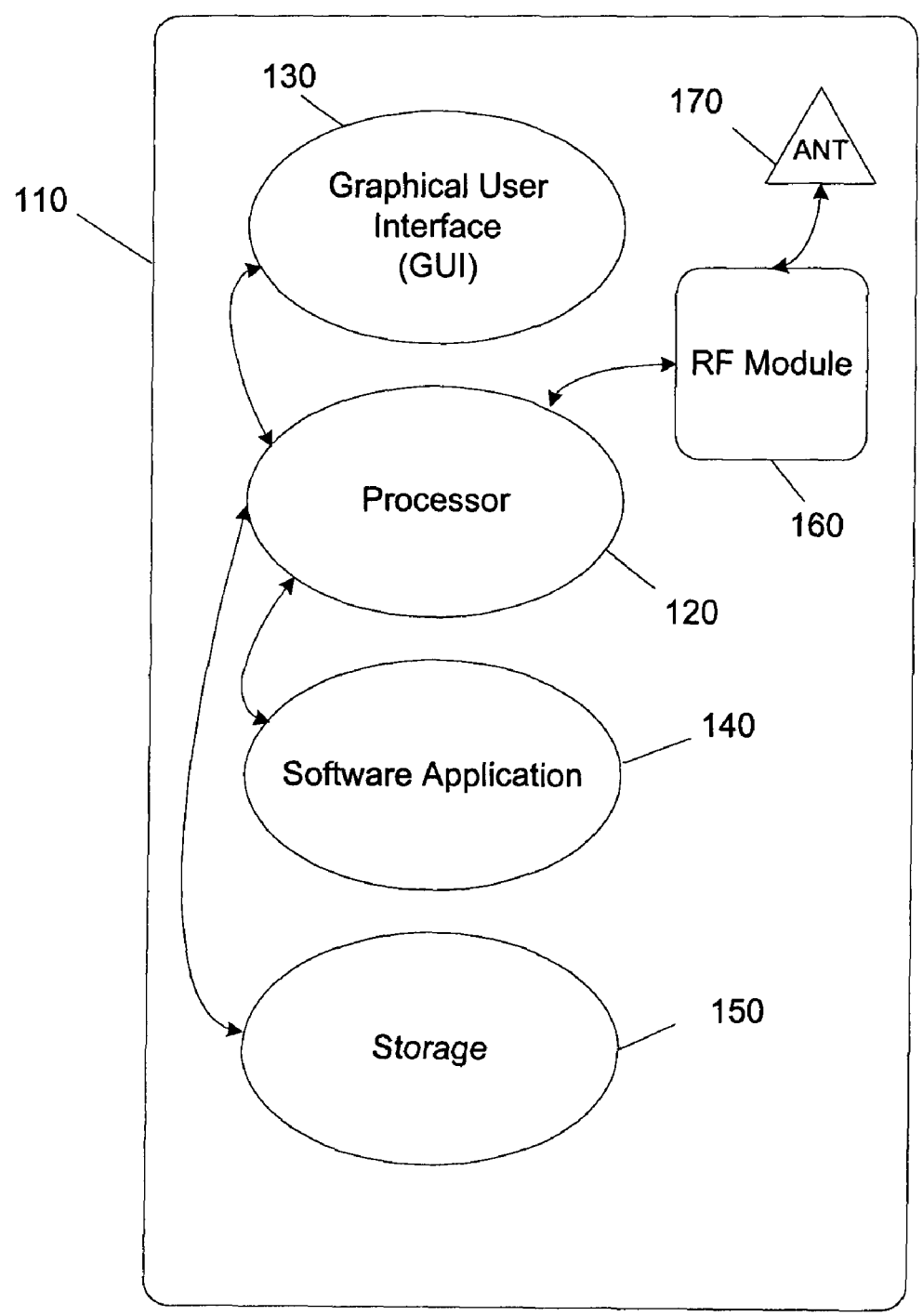
FIG. 1 is a block diagram of a mobile phone showing components within the mobile phone that are used to carry out the invention.

FIG. 1 is a block diagram of a mobile phone 110 showing components within the mobile phone 110 that are used to carry out the invention.

Central to the mobile phone 110 is a processor 120 that has control over and access to the other components within the mobile phone that comprise the invention. A graphical user interface (GUI) 130 provides an interface with the user of the mobile phone 110 to navigate and launch a data software application 140, the purpose of which is to receive and respond to promotional offers. GUI 130 displays status information and prompts for input(s) at the behest of the data software application 140 running on processor 120. Processor 120 is also coupled with storage means 150. Storage means 150 can be used to store promotional offer data as well as mobile phone data that can be incorporated into a promotional offer entry. An RF module 160 and antenna 170 combination is coupled with the processor 120 and provides a communication link with a promotional sponsor.

The configuration shown in FIG. 1 allows for the mobile phone 110 to receive promotional offer data over-the-air (OTA). It further allows a mobile phone user to compose and edit a promotional offer entry via GUI 130 in response to a promotional offer. Once an entry has been composed, the RF module facilitates sending the entry to the sponsor for consideration. The promotional offer entry is comprised of data that the promotional sponsor has requested from the mobile phone user.

Figure 2:
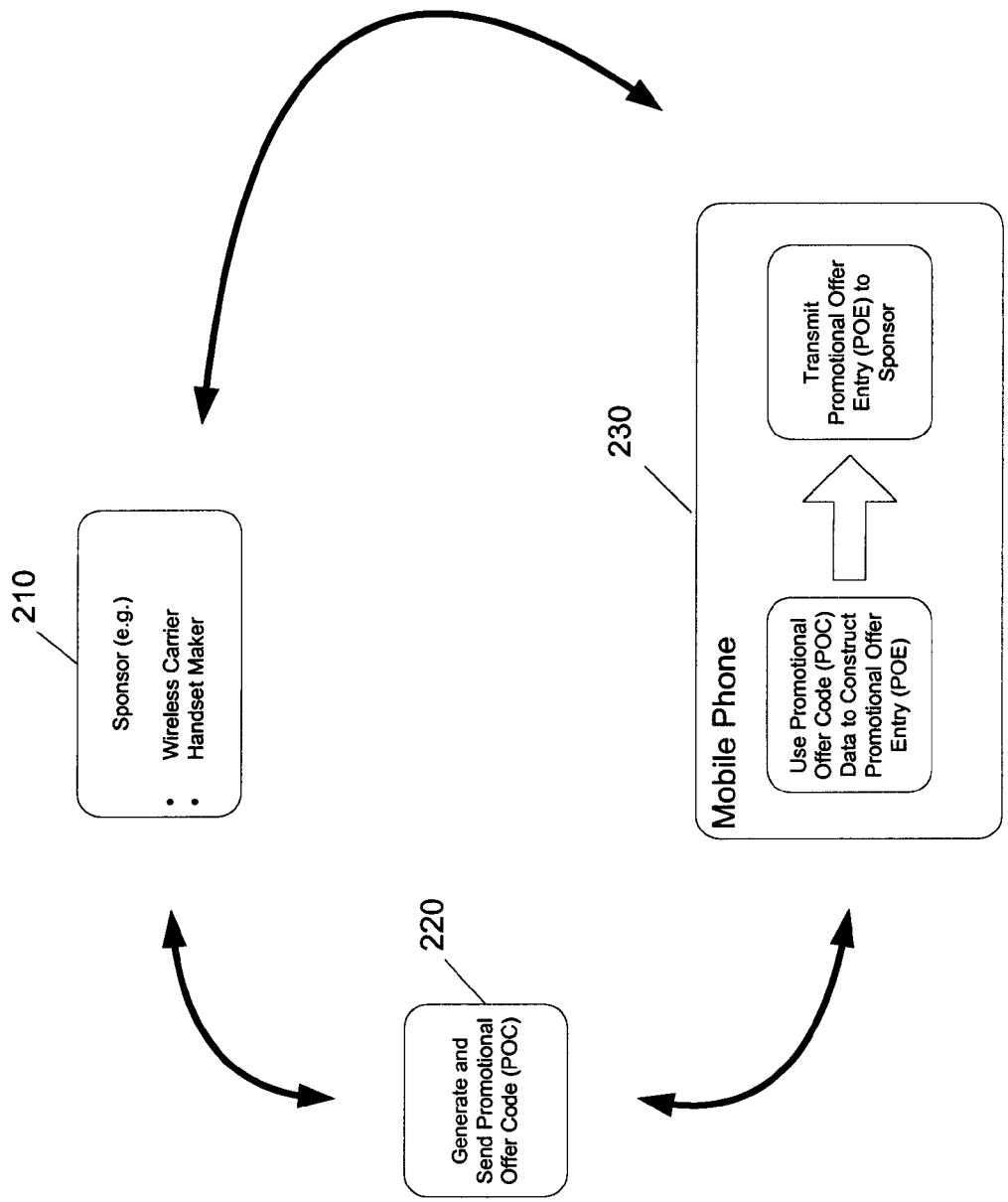
FIG. 2 is a data flow diagram illustrating the flow of data between a promotional sponsor and a participating mobile phone.

FIG. 2 is a data flow diagram illustrating the flow of data between a promotional sponsor and a participating mobile phone. A sponsor 210 initiates contact either directly or indirectly with potential entrants for a specific promotion. The sponsor may have any number of reasons for running a promotion from information gathering exercises to marketing exercises. For instance, handset makers may wish the mobile phone user to remain loyal to the brand and offer upgrades or accessories via promotional offers. Wireless carriers may also wish to promote brand loyalty by offering service enhancements, free minutes, or other valuable promotional offers.

Direct contact between a sponsor and a mobile phone would likely occur as an SMS or MMS message sent to the mobile phone describing the promotion and how to enter. Indirect contact between a sponsor and a mobile phone could occur any number of ways, including, but not limited to, a television commercial, a magazine advertisement, a radio commercial, an Internet advertisement, etc. The indirect solicitation would either detail the promotional offer or provide a source for the mobile phone user to go to obtain details regarding the promotion.

The sponsor, in one form or another, generates and sends or makes available promotional offer data 220 to the mobile phone. The mobile phone then converts the promotional offer data to a promotional offer entry 230 that is then transmitted back to the sponsor 210. The sponsor then determines a winner or winners.

Figure 3:
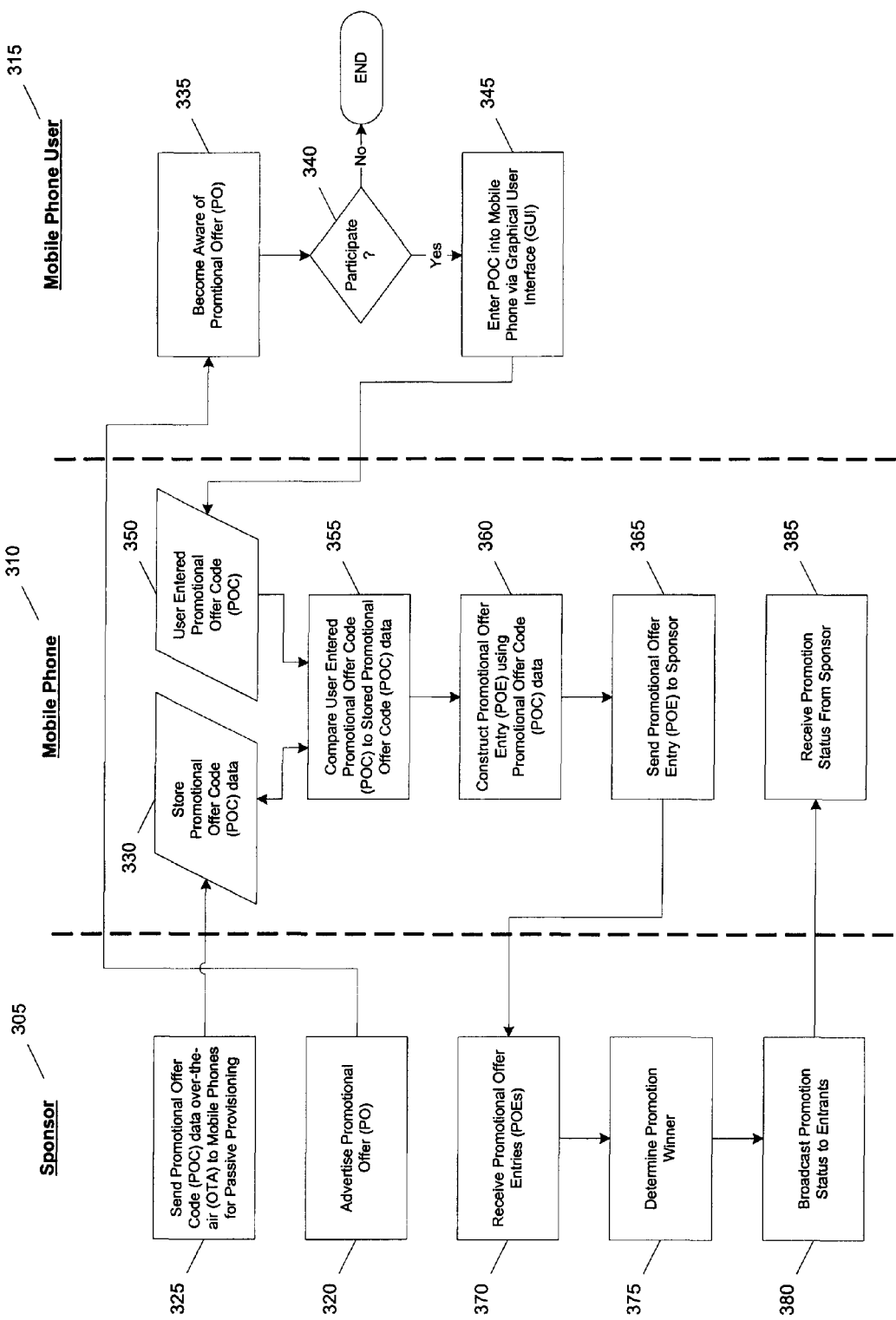
FIG. 3 is a flowchart detailing the processes of the present invention.

FIG. 3 is a flowchart illustrating the processes of the present invention in greater detail. There are three entities nominally illustrated in FIG. 3 including a sponsor 305, a mobile phone 310, and a mobile phone user 315. Data flows among these entities such that a promotional campaign is conducted. The sponsor 305 is responsible for setting up and defining the parameters of a promotional offer. The mobile phone 310 is the physical device used by the mobile phone user 315 to communicate with the sponsor 305 to participate in the promotional offer.

A promotional campaign begins with the sponsor 305. The sponsor 305 creates and defines the terms and parameters of a promotional offer that will require the use of a mobile phone 310 to participate. The promotional offer is then advertised publicly 320 to solicit interest from mobile phone users 315. Part of the advertisement could include a promotional offer code (POC) that a mobile phone user would use to participate in the promotional offer.

In some instances, the POC may already have been provisioned on the mobile phone by the handset maker at the time of manufacture. This would allow a specific mobile phone handset maker the ability to craft and sponsor promotions that could only be entered by mobile phones made by that handset maker. The motivation for the mobile phone handset maker could be to reward and engender brand loyalty. In this scenario, the mobile phone handset maker would embed POCs into the mobile phones for later use.

In other instances, a POC can be passively provisioned 325 to a qualifying group of mobile phones in an over-the-air (OTA) manner. This could occur when the sponsor is a wireless carrier. The wireless carrier has the ability to send OTA data to a mobile phone on their network in a passive manner. The mobile phone would simply receive and store 330 a POC without direct mobile phone user involvement. The wireless carrier's motivation could be similar to that of a mobile phone handset maker, namely, reward and engender brand loyalty.

Once the promotional campaign is designed and advertised it is up to individual qualifying mobile phone users 315 to participate. The first step for the mobile phone user 315 is to become aware of the promotional offer (PO) 335. Once aware, the mobile phone user 315 would then decide whether to participate 340. If the mobile phone user 315 desires to participate he navigates his mobile phone's menu structure to a "promotions" screen and enters the POC from the advertisement into the mobile phone 345 via a graphical user interface (GUI). The mobile phone 310 then compares the POC just entered 350 with a list of stored POCs 355. If a match is found, the mobile phone then constructs a promotional offer entry (POE) 360 based on the stored POC data.

Constructing a POE from POC data entails composing a message to the sponsor that will indicate the mobile phone user's desire to participate in the promotional offer. The POC data specifies to whom the message should be addressed, how the message will be sent, and what content is to be included or attached to the data. The data is then fetched and included with the message to form a promotional offer entry (POE). If the POC data specifies that the user enter additional data, the software application will launch a template that the user will fill out. This data is then included with the POE.

The data that can be attached to form a POE can be device specific. For instance, mobile phone identifying data (e.g. electronic serial number (ESN), International mobile equipment identity (IMEI) model number, and/or mobile telephone number) can be included in a POE. Service information such as carrier name, minutes used, amount of data sent and received, and number of SMS and/or MMS messages exchanged can be specified as well. The sponsor can then parse this data to glean valuable demographic information pertaining to the customers and their user characteristics. Some carriers may have higher data usages than others. Such information would help the handset makers market and promote to specific carriers or even specific regions that exhibit different characteristics.

Since the POE may include sensitive personal information, it can be encrypted before being sent to the sponsor. This is an extra measure of security that protects both the sponsor and participant.

Consider a scenario where a handset maker is the sponsor 310. The promotional offer is extended to mobile phone users that have a particular model made by the handset maker. Thus, the POC data can specify that a valid POE contain the electronic serial number (ESN) of the phone. This information can be used by the handset maker (sponsor) to verify that the mobile phone is indeed the model identified in the promotion.

Consider another scenario where a wireless carrier is the sponsor 310. This time a promotional offer is extended to that carrier's subscribers that have used over 1000 minutes of airtime in the last thirty (30) days. The POC data for this promotion requires a valid POE to come from a mobile phone that meets the aforementioned minutes used parameter. When a POE is constructed from using the POC data, the mobile phone accesses and verifies and attaches the mobile phone's minutes used data to the POE. The wireless carrier can then select from among the entrants a winner. A bonus prize could even go to the entrant with the most minutes used in the last thirty (30) days with this entrant identified as "super-user of the month".

By setting different promotional parameters, sponsors can identify and reward certain customers. Wireless carriers can run promotions for high use customers (like that in the scenario above) or new users (those who have signed a service contract in the last sixty (60) days) in order to get and keep them engaged with the sponsor.

Once the POE has been constructed 355, it is then sent from the mobile phone to the sponsor 365. The sponsor 310 receives POEs 370 from a variety of entrants. The POC data could specify a time limit to participate so that the sponsor knows when to stop accepting entries. Alternatively, the POC data could be programmed with a time limit such that a POE could not be constructed after a predetermined date. Once all entries have been received by the sponsor, a winner or winner(s) can be selected 375. The sponsor could then broadcast the promotion status 380 to all entrants or only those that actually won something. The mobile phone would receive 385 (most likely in the form of a message (SMS or MMS), e-mail, or voice mail) notification of the promotional offer status from the sponsor concluding the promotional campaign.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A mobile phone having a software application that allows a user of the mobile phone to participate in a promotional offer, said mobile phone comprising:
   a processor;
   a processor readable storage medium comprising one or more code portions embodied therein, the one or more code portions causing the processor to:
   load promotional offer data into the processor readable storage medium of the mobile phone, the promotional offer data comprising one or more promotional offer codes;
   receive user input of a promotional offer code into the mobile phone;
   compare the user-inputted promotional offer code with the one or more promotional offer codes;
   in response to determining one of the one or more promotional offer codes matches the user-inputted promotional offer code, construct a promotional offer entry;
   using transmission information provided in the promotional offer data, determine how the promotional offer entry will be transmitted and to whom the promotional offer entry will be transmitted; and
   initiate transmission of the promotional offer entry based on the determining how the promotional offer entry will be transmitted and to whom the promotional offer entry will be transmitted.

2. The mobile phone of claim 1 wherein the promotional offer data is sent to the mobile phone via an over-the-air (OTA) process.

3. The mobile phone of claim 1 wherein the promotional offer data comprises data that is pre-provisioned in the mobile phone by a manufacturer embedding the promotional offer data into the mobile phone.

4. The mobile phone of claim 1 wherein the one or more code portions further causes the processor to:
   create a message addressed to a sponsor of the promotional offer in a format described by the promotional offer data; and
   include content described by the promotional offer data in the message.

5. The mobile phone of claim 4 wherein the one or more code portions further causes the processor to: encrypt the message.

6. The mobile phone of claim 4 wherein the format of the promotional offer entry defined by the promotional offer data comprises an SMS message.

7. The mobile phone of claim 4 wherein the format of the promotional offer entry defined by the promotional offer data comprises an MMS message.

8. The mobile phone of claim 4 wherein the format of the promotional offer entry defined by the promotional offer data comprises an e-mail message.

9. A method comprising:
   providing a mobile phone having a processor and computer-readable media, the computer-readable media comprising an application stored thereon;
   loading promotional offer data into the computer-readable media of the mobile phone, the promotional offer data comprising one or more promotional offer codes;
   receiving user input of a promotional offer code into the mobile phone;
   comparing, using the processor of the mobile phone and application stored on the computer-readable media, the user-inputted promotional offer code with the one or more promotional offer codes;
   in response to determining one of the one or more promotional offer codes matches the user-inputted promotional offer code, constructing a promotional offer entry;
   using transmission information provided in the promotional offer data, determining how the promotional offer entry will be transmitted and to whom the promotional offer entry will be transmitted; and
   initiating transmission of the promotional offer entry from the mobile phone based on the determining how the promotional offer entry will be transmitted and to whom the promotional offer entry will be transmitted.

10. The method of claim 9 wherein the promotional offer data is sent to the mobile phone via an over-the-air (OTA) process.

11. The method of claim 9 wherein the promotional offer data comprises data that is pre-provisioned in the mobile phone by a manufacturer of the mobile phone embedding the promotional offer data into the mobile phone.

12. The method of claim 9 wherein constructing a promotional offer entry comprises:
   creating a message in a format described by the promotional offer data; and
   including content described by the promotional offer data in the message.

13. The method of claim 12 wherein constructing a promotional offer entry further comprises encrypting the message.

14. The method of claim 12 wherein the format of the promotional offer entry defined by the promotional offer data comprises at least one of an SMS message, an MMS message, or an email message.

15. A mobile phone enabling a user of the mobile phone to participate in a promotional offer, said mobile phone comprising:
   a radio frequency (RF) module;
   a user interface enabling the user of the mobile phone to input a promotional offer code into the mobile phone;
   a processor;
   a processor readable storage medium comprising one or more code portions embodied therein, the one or more code portions causing the processor to:
   load promotional offer data into the processor readable storage medium of the mobile phone, the promotional offer data comprising one or more promotional offer codes,
   compare the user-inputted promotional offer code with the one or more promotional offer codes,
   in response to determining one of the one or more promotional offer codes matches the user-inputted promotional offer code, constructing a promotional offer entry,
   using transmission information provided in the promotional offer data, determine how the promotional offer entry will be transmitted and to whom the promotional offer entry will be transmitted, and initiate transmission of the promotional offer entry based on the determining how the promotional offer entry will be transmitted and to whom the promotional offer entry will be transmitted.

16. The mobile phone of claim 15 wherein the promotional offer data is sent to the mobile phone via an over-the-air (OTA) process.

17. The mobile phone of claim 15 wherein the promotional offer data comprises data that is pre-provisioned in the mobile phone by the manufacturer embedding the promotional offer data into the mobile phone.

18. The mobile phone of claim 15 wherein the one or more code portions further causes the processor to:

create a message addressed to a promotional sponsor in a format described by the promotional offer data; and include content described by the promotional offer data in the message.

19. The mobile phone of claim 18 wherein the one or more code portions further causes the processor to encrypt the message.

20. The mobile phone of claim 18 wherein the format of the promotional offer entry defined by the promotional offer data comprises at least one of an SMS message, an MMS message, or an email message.

21. The method of claim 9 further comprising:

determining, based on accessing the promotional offer data, whether a time limit associated with the user-inputted promotional offer code has expired, the promotional offer data further comprising a time limit associated with the one or more promotional offer codes, and the constructing a promotional offer entry further comprising:

in response to both determining one of the one or more promotional offer codes matches the user-inputted promotional offer code and determining the time limit associated with the user-inputted promotional offer code has not expired, constructing a promotional offer entry.

22. The method of claim 9 further comprising: prior to initiating transmission of the promotional offer entry, attaching additional content, as specified by the promotional offer data, to the promotional offer entry, the attached content comprising a mobile phone number.

23. The method of claim 22, wherein the attached content further comprises a number of minutes used by the mobile phone.

24. The method of claim 23, wherein the attached content further comprises an amount of data sent or received by the mobile phone.

25. The method of claim 24, wherein the attached content further comprises a number of messages sent or received by the mobile phone.

26. The method of claim 25, wherein the attached content further comprises an electronic serial number.

27. The method of claim 26, wherein the attached content further comprises an international mobile equipment identity model number.

* * * * *